United States Patent [19]
Harned

[11] 3,977,378
[45] Aug. 31, 1976

[54] SELF-CONTROLLED VAPOR HEAT CAPSULE FOR ENGINE INTAKE MIXTURE HEATING

[75] Inventor: John L. Harned, Grosse Pointe Woods, Mich.

[73] Assignee: General Motors Corporation, Detroit, Mich.

[22] Filed: June 30, 1975

[21] Appl. No.: 591,276

[52] U.S. Cl. .................. 123/122 AC; 123/122 AB; 165/105; 165/52
[51] Int. Cl.² ........................................ F02M 31/00
[58] Field of Search... 123/122 AC, 122 H, 122 AB; 165/105, 52

[56] References Cited
UNITED STATES PATENTS

| | | | |
|---|---|---|---|
| 3,749,158 | 7/1973 | Szabo | 165/105 |
| 3,749,962 | 7/1973 | Smith | 165/105 |
| 3,763,838 | 10/1973 | Lindsay | 165/105 |

Primary Examiner—Charles J. Myhre
Assistant Examiner—R. H. Lazarus
Attorney, Agent, or Firm—Robert J. Outland

[57] ABSTRACT

An internal combustion engine is provided with a vapor heat capsule that utilizes a vaporizable heat transfer fluid to conduct heat from the engine exhaust gases to a hot plate for heating the intake air-fuel mixture. The rate of heat transfer and temperature of the heated surface are controlled by selection of a heat transfer fluid, the volume of fluid used and design parameters of the heat capsule to obtain, upon vaporization of all the fluid within the capsule, a fluid boiling and condensing temperature of a predetermined value below the coking temperature of the fuel. The rate of heat flow through the capsule is varied automatically in response to the cooling effect on the hot plate of heating air-fuel mixture and vaporizing varying amounts of liquid fuel droplets.

5 Claims, 7 Drawing Figures

SELF-CONTROLLED VAPOR HEAT CAPSULE FOR ENGINE INTAKE MIXTURE HEATING

FIELD OF THE INVENTION

This invention relates to intake mixture heating systems for internal combustion engines and more particularly to systems wherein heat is transferred from gases in an exhaust manifold to air-fuel mixture in an intake manifold through a sealed capsule containing a vaporizable heat transfer fluid.

BACKGROUND OF THE INVENTION

It is known in the art relating to spark ignited gasoline fueled internal combustion engines, particularly those for automotive use, to provide means for heating the intake air-fuel mixture with heat transferred from the engine exhaust gases. A known arrangement for such systems provides a hot plate or wall exposed to hot exhaust gases and arranged at a low point of an intake manifold passage, preferably below the carburetor, which is exposed to the inlet air-fuel mixture and upon which liquid fuel droplets are directed for vaporization. To prevent overheating and coking of the fuel, the amount of exhaust heat directed to the plate is generally controlled by a mechanical valve which diverts some or all of the exhaust gases through another passage when the desired operating temperature is reached. While such systems have given very satisfactory service, it is desirable to provide a system capable of quickly reaching operating temperature and controlling the amount of heat transferred to the fuel, while avoiding the complexity of mechanical valve control devices.

SUMMARY OF THE INVENTION

The present invention provides a simple arrangement of a vapor heat capsule, arranged for use in combination with internal combustion engine intake and exhaust manifolds, which is capable of providing a controlled transfer of exhaust heat to the intake mixture for vaporizing the fuel therein on a controlled temperature hot plate, without the use of any moving parts other than the heat transfer fluid, itself, and with a minimum of structural complexity.

The invention involves the provision of a low mass capsule defining a boiler-condenser chamber of selected size and with a predetermined volume of a selected heat transfer fluid having physical characteristics such that upon complete vaporization of the charge of heat transfer fluid within the capsule, the boiling and condensing temperature of the fluid at the pressure reached within the capsule is sufficiently high to transfer the desired heat flow, but remains below the coking temperature of the fuel in the air-fuel mixture. Control of heat transfer is then varied automatically upon demand due to temperature variation of the hot plate caused by vaporization of fuel droplets impinging thereon and heating of air-fuel mixture adjacent thereto.

These and other features and advantages of the invention will be more fully understood from the following description of the structure and operation of a preferred embodiment taken together with the accompanying drawings.

GENERAL DESCRIPTION

Figure 1:
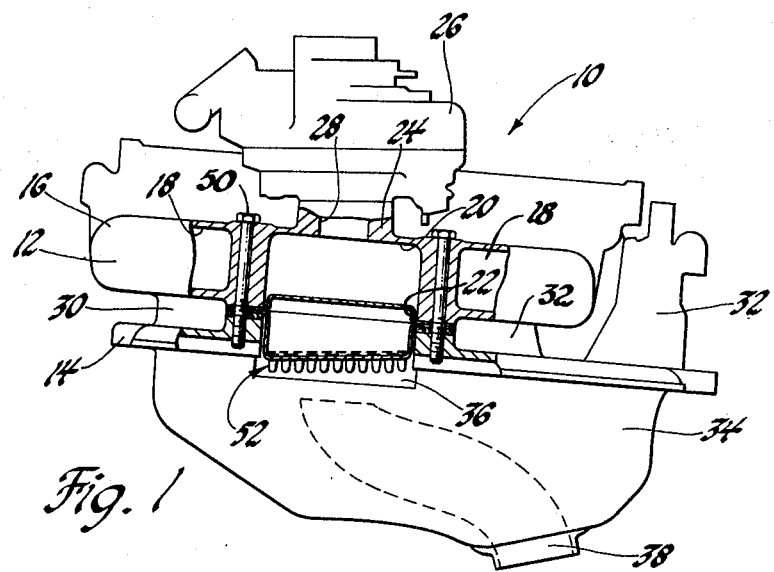
FIG. 1 is a side elevational view of an internal combustion engine illustrating the manifolding arrangement with a portion removed to show the application of a vapor heat capsule according to the invention.
Figure 2:
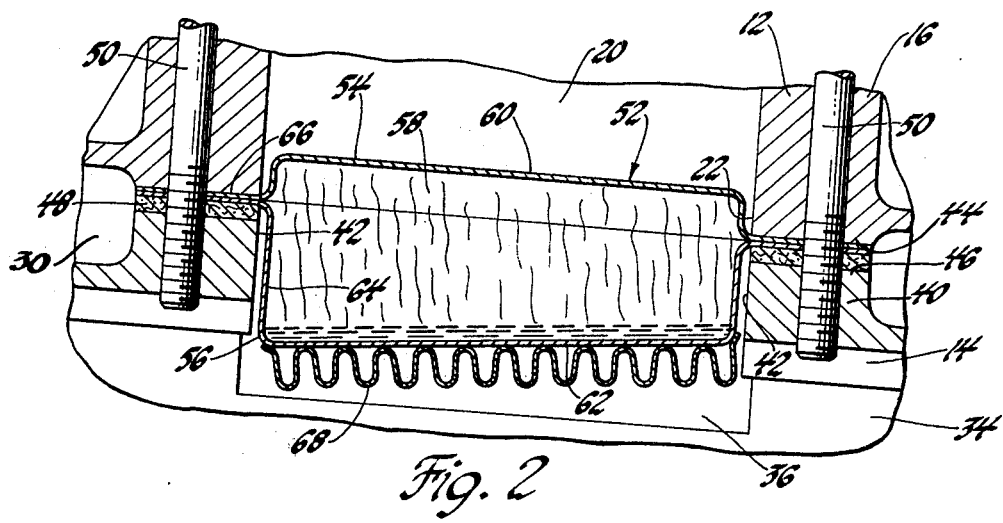
FIG. 2 is an enlarged view showing the capsule arrangement of FIG. 1 in an operational mode wherein the heat transfer fluid within the capsule is beginning to vaporize.
Figure 3:
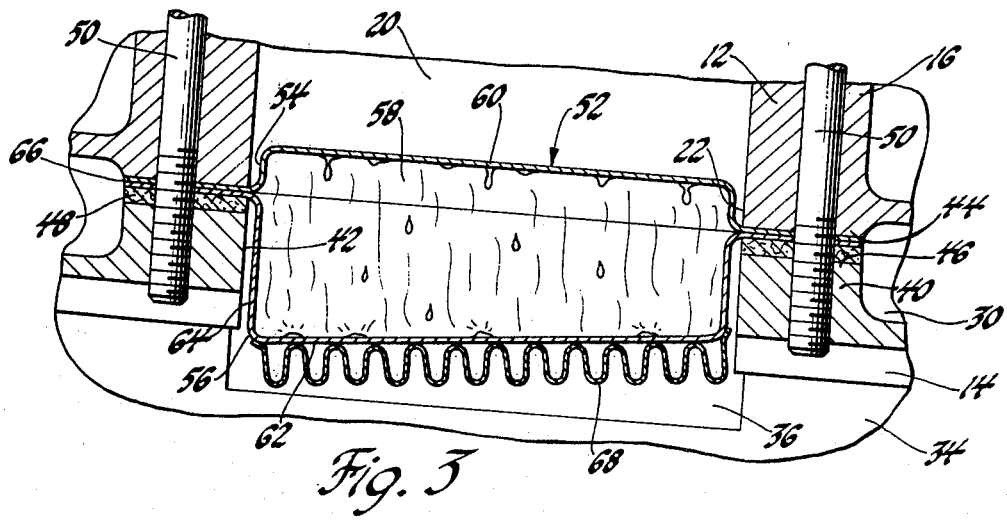
FIG. 3 is a view similar to FIG. 2, but illustrating another operational mode, wherein the capsule fluid is completely vaporized and the rate of heat transfer is being controlled by the demand heat loss from the hot plate.

Referring first to FIGS. 1–3 of the drawings, there is shown an internal combustion engine generally indicated by numeral 10. Although not shown in detail, engine 10 is representative of a conventional four cylinder in-line piston engine of conventional construction. Engine 10 is provided with an intake manifold 12 and an exhaust manifold 14 which are separately formed and are connected with the usual combustion chamber intake and exhaust ports, not shown.

The intake manifold 12 comprises a cast body 16 having a generally longitudinal mixture passage 18 connecting with a central plenum 20. The bottom of the plenum is open to define a heat opening 22. Centered directly above the plenum is a riser 24 on which is mounted a carburetor 26 that supplies air-fuel mixture to the manifold through an opening 28 in the riser, connecting the carburetor throat, not shown, with the plenum 20. The exhaust manifold comprises a cast body 30, including a plurality of exhaust legs 32, connecting with a main body portion 34, defining a central plenum 36 into which the exhaust gases from the various engine cylinders are directed for further reaction before they are exhausted from an outlet connection 38.

At a point opposite the intake manifold plenum, the exhaust manifold is provided with a mounting boss 40 defining a heat opening 42, aligned with the heat opening 22 of the intake manifold plenum. These two heat openings are surrounded by opposing flanges 44, 46 of the intake and exhaust manifolds, respectively. A gasket 48, formed of heat insulating material, separates the two flanges 44, 46 to prevent substantial transfer of heat directly between the exhaust and intake manifolds. Bolts 50 extending through the flanges are provided to retain the exhaust and intake manifolds in assembly.

Retained within the heat openings 22, 42 of the intake and exhaust manifolds, respectively, and separating the intake manifold plenum 20 from the exhaust plenum 36 is a vapor heat capsule 52 formed according to the present invention. The capsule is simply constructed of upper and lower flanged cup-like members 54, 56 respectively, having their open ends joined and sealed along their flanged surfaces to define an internal chamber 58, defined by a generally flat upper condensing wall or hot plate 60, a second generally flat and lower evaporating wall or boiler surface 62 and a peripheral side wall 64 interconnecting the upper and lower walls.

A lateral flange 66 extends outwardly from the side wall 64 and is retained between the flange 44 of the intake manifold and the insulating gasket 48, which is held in place above the exhaust manifold flange 46. The capsule chamber 58 fills the major portion of the heat openings 22, 42, except for a small clearance space between the side wall 64 and the walls 22, 42 of the openings, the clearance being provided to limit heat transfer directly between the capsule and the walls of the manifold. The remainder of the space between the openings is closed by the laterally extending flange 66 so that there is no gas transfer between the intake and exhaust plenums 20, 36, and the only path for substantial heat transfer is through the capsule 52.

The bottom wall 62 of the capsule is provided with fins 68 in the form of a serpentine sheet metal element secured to the lower face of wall 62 and exposed to exhaust gases in the plenum 36. The fins increase the area of the lower wall exposed to the hot gases and, thus, increase the capability of heat transfer from the gases to the lower wall 62. The upper wall forms the bottom wall of the intake manifold plenum 20 and, thus, provides a surface for collection of liquid fuel droplets and for impingment of air-fuel mixtures supplied by the carburetor to the manifold plenum.

Within the chamber 58, defined by the capsule, there is contained a limited volume of vaporizable heat transfer fluid. The characteristics and amount of fluid provided are determined by the desired control temperature of the hot plate 60 formed by the upper wall of the capsule. The boiling temperature of the fluid supplied must remain in a range below the normal operating temperature of the exhaust gases to which the capsule is exposed, and should also be above the temperature required to vaporize all the fuel in the intake mixture supplied to the intake manifold. However, the maximum boiling temperature which the fluid reaches at the pressure within the capsule when all the fluid has been evaporated must remain below the temperature at which fuel in the intake manifold will be overheated and coke on the surface of the hot plate 60.

Preferably, heat transfer fluids usable in this application would have the following characteristics:
  Molecular Weight – 100 to 500
  Boiling Point at Atmospheric Pressure – 60° to 125°C
  Density – 1 to 2 g/cc
  Vapor Density – .002 to .02 g/cc
  Liquid Heat Capacity – 0.8 to 2 joules/g-° C
  Heat of Vaporization – 50 to 350 joules/gram
  Thermally Stable Below 400° C
The volume of fluid used should range between 0.03 and 0.15 times the volume of the enclosed heat capsule chamber. Some examples of synthetic fluorocarbon fluids exemplary of the types of fluids considered suitable for use in a capsule of the type disclosed are given in Table I.

Table I

PHYSICAL PROPERTIES OF HEAT TRANSFER FLUIDS SUITABLE FOR USE IN THE EFE HEAT CAPSULE

| Property | Perfluoro-2-Butyl-Tetrahydrofuran (Monsanto FC-75) | Hexafluorobenze (Monsanto CP-28) | Pentafluoro-Benzene |
|---|---|---|---|
| Formula | $C_8F_{16}O$ | $C_6F_6$ | $C_6F_5H$ |
| Molecular Weight | 416.08 | 186.057 | 168.067 |
| Boiling Point (°C) | 102.6 | 80.15 | 85.15 |
| Freezing Point (°C) | −62 | 5.56 | 10.8 |
| Liquid Density (g/cc) | 1.55 | 1.613 | 1.522 |
| Liquid Heat Capacity at 20° C (J/g–° C) | 1.05 | 1.15 | 1.11 |
| Vapor Density at b.p. (g/cc) | .0148 | .00642 | .00572 |
| Heat of Vaporization at b.p. (J/g) | 81.2 | 172 | 192 |

FIGS. 4–7 illustrate graphically the characteristics of an engine installation, as shown in FIGS. 1–3, utilizing the fluid $C_8F_{16}O$ (Monsanto FC-75).

Figure 4:
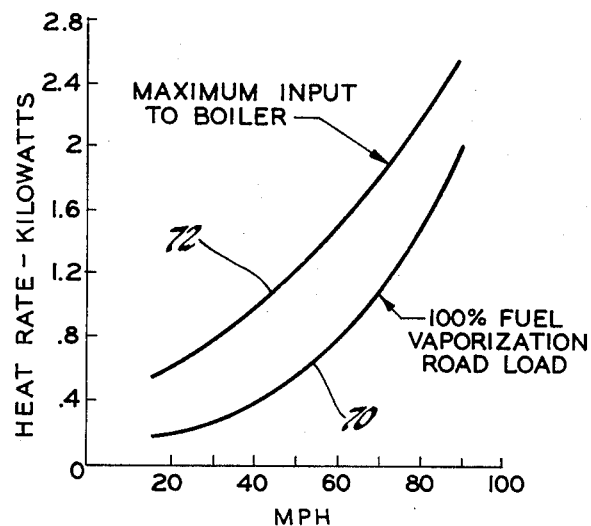
FIGS. 4–7 are graphs illustrating various operational characteristics of the embodiment shown in FIGS. 1–3.

FIG. 4 illustrates in the lower curve 70 the amount of heat required to vaporize all the fuel in the air-fuel mixture supplied to the engine at various vehicle speeds under steady state conditions. The upper curve 72 indicates the higher amount of heat input it is possible to supply from the exhaust gases to the boiler wall 62 under the same range of vehicle speeds and comparable engine load conditions. This maximum heat input capacity must be sufficiently higher than the steady state fuel vaporization requirements in order to provide for fast warm up of the system and ability to control the vaporization of fuel mixtures over the desired range of operating conditions.

In a specific example, a capsule to meet the requirement of FIG. 4 is formed with a hot plate area of 75 sq. cm. and a chamber volume below the hot plate of 300 cu. cm. The chamber is charged with 20 cu. cm. of the fluid per fluoro-2-butyltetrahydrofuran, having the chemical formula $C_8F_{16}O$, and available from Monsanto under their designation FC-75. The characteristics of this fluid are indicated in the first column of Table I.

OPERATION

Operation of the engine with the vapor heat capsule is as follows:

When the engine is started cold, the fluid in the capsule is substantially all in liquid form and resides on the bottom wall 62 of the capsule, which is preferably arranged to be level as the engine is installed in the vehicle so that the fluid is dispersed evenly over the inner surface of the bottom wall. Because of the small volume of fluid utilized and the thin sheet metal construction of the capsule wall, the exhaust gases quickly heat the boiler wall 62 to the boiling point of the liquid within the capsule.

At this time the liquid begins to boil and vapor rises in the capsule, as illustrated in FIG. 2. When the hot vapor contacts the relatively cold upper wall or hot plate 60, it condenses, transferring its heat to the plate and increasing the plate temperature, which in turn makes heat available to the fuel droplets and air-fuel mixture impinging on the upper surface of the plate. As the plate temperature rises, the fuel droplets are vaporized and the adjacent air-fuel mixture is heated to an increasing extent.

When the hot plate upper wall surface 60 reaches the desired operating temperature range, which is near the heat transfer fluid boiling temperature, the amount of condensation of vapor on the lower surface of the wall is diminished, since the wall is no longer cold enough to condense the vapor. At this point, vaporization of the liquid heat transfer fluid from the boiler wall 62 exceeds the rate of condensation at the hot plate 60 until substantially all of the heat transfer fluid is vaporized and the rate of heat transfer is sharply cut back.

This condition is illustrated in FIG. 3 where the major portion of the heat transfer fluid has been vaporized. In this condition, the rate of heat transfer through the capsule is determined completely by the rate at which vapor condenses on the upper wall and drops to the lower wall where it is immediately vaporized again. Thus, the amount of heat transfer is controlled by the demand for heat caused by cooling of the hot plate 60 through vaporization of fuel droplets and heating of adjacent air-fuel mixture, which in turn causes heat transfer fluid in the capsule to condense on the lower surface of the hot plate wall.

Figure 5:
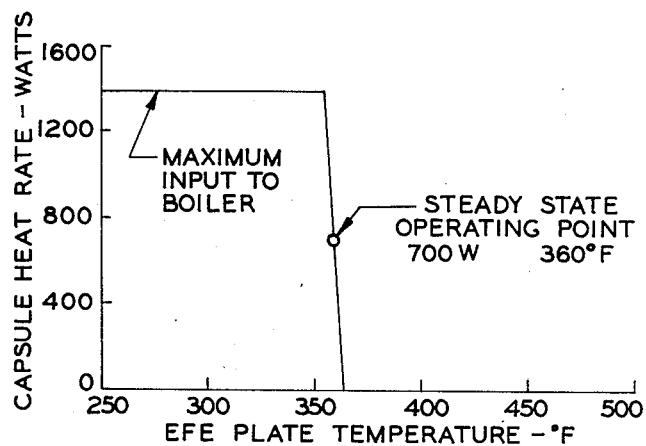

FIG. 5 shows in graphical form the result of this self-control feature of the vapor heat capsule. With the engine operating at a load where the maximum heat input to the boiler is 1400 kilowatts, as shown in the figure, the increase in temperature of the hot plate 60 to about 350° F causes the rate of condensation of heat transfer fluid to be cut back sharply, thus reducing heat flow through the capsule to the rate required to maintain the hot plate temperature at the control point, in this case 360° F with a heat flow of 700 watts. If the load increases, causing more fuel to impinge on the hot plate, the additional cooling of the plate will increase the amount of condensation, raising the heat transferred through the capsule up toward the maximum of 1400 watts available and slightly reducing the hot plate temperature to 350° or slightly greater. If on the other hand the engine load decreases, the hot plate temperature will increase to about 365°, at which point heat transfer will be cut off completely, since no condensation of the vapor on the hot plate will occur above this point.

The slope of the capsule heat transfer rate/differential temperature change shown in FIG. 5 is about 180 watts/°F. This slope defines the thermal conductivity of the capsule and it is determined (for given capsule design parameters, physical properties of the heat transfer fluid and mass of heat transfer fluid in the capsule) by the residual inert gas or air mass remaining in the capsule after it has been evacuated, charged with heat transfer fluid, and hermetically sealed. For the specific example cited of a 300 cc capsule containing 20 cc of Monsanto FC-75, the slope shown in FIG. 5 of 180 watts/°F is based on a residual nitrogen gas pressure of .00125 atmospheres. Increasing the residual inert gas pressure decreases the capsule thermal conductivity, and decreasing the pressure increases conductivity.

Figure 6:
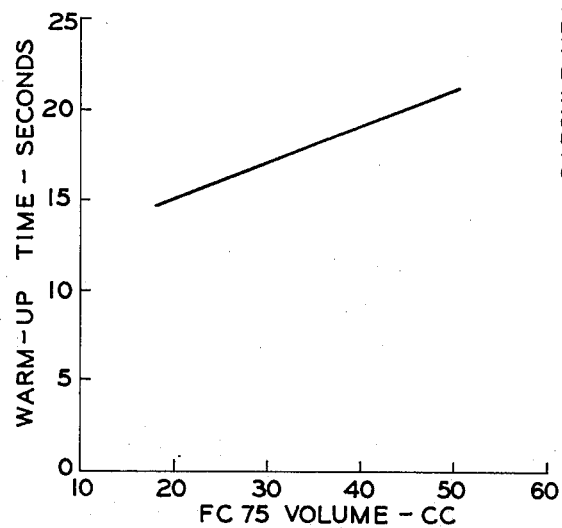

FIG. 6 illustrates the time required for warm up of the capsule with varying amounts of heat transfer fluid. This shows that with the preferred 20 cu. cm. volume the capsule warms up to normal temperature in only 15 seconds, whereas greater volumes of fluid increase the required warm up time, as indicated.

Figure 7:
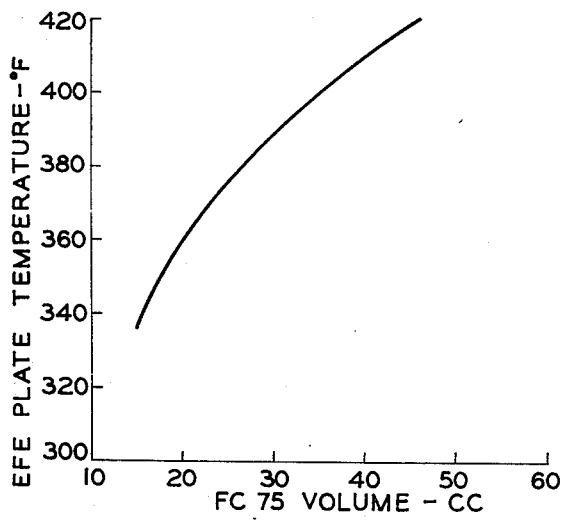

FIG. 7 shows the effect upon the capsule control temperature of varying the volume of fluid within the chamber. At the 20 cu. cm. volume selected, the plate temperature is maintained at about 360° F. Increasing the volume of fluid increases the pressure which the capsule chamber reaches upon vaporization of all the fluid, and this increases the boiling point of the fluid and thus the control temperature of the hot plate under these conditions. Thus, it is seen by properly selecting the characteristics of the heat transfer fluid, the size of the chamber and the volume of fluid utilized, the capsule may be made to provide a desired heat flow rate, while controlling the temperature of the hot plate within a desired narrow temperature range.

While the invention has been described by reference to one specific embodiment, it should be understood that various changes are possible without departing from the inventive concepts disclosed. Accordingly, it is intended that the invention be given the full scope of the following claims.

What is claimed is:

1. A vapor heat transfer capsule in combination with an internal combustion engine to transfer heat from gases in the exhaust manifold to the mixture in the intake manifold, said heat transfer capsule comprising wall means defining a sealed enclosed chamber, said wall means including a flat upper condensing wall forming a hot plate, a flat lower evaporating wall forming a boiler surface and side walls interconnecting said upper and lower walls, said walls being of relatively low mass and said upper and lower walls being formed of thin heat conductive sheet metal, a flange connecting with and extending outwardly from said wall means to support said capsule within said engine manifold passage with said upper wall exposed to the intake air-fuel mixture and said lower wall exposed to the engine exhaust gases, and a predetermined volume of heat transfer fluid within said chamber, said fluid having in the liquid state a volume of from 0.03 to 0.15 times the volume of said chamber and having a molecular weight in the range of from 100 to 500, a boiling point at atmospheric pressure in the range of from 60° to 125° C, liquid density between 1 and 2 grams per cubic cm., vapor density between 0.002 and 0.02 grams per cu. cm., liquid heat capacity between 0.8 and 2 joules per gram-degree C, heat of vaporization at the boiling point from 50 to 350 joules per gram, and said heat transfer fluid being thermally stable at temperatures below about 400° C.

2. The capsule of claim 1 wherein said heat transfer fluid is a synthetic fluorocarbon having the chemical formula $C_8F_{16}O$.

3. The capsule of claim 1 wherein said heat transfer fluid is a synthetic fluorocarbon having the chemical formula $C_6F_6$.

4. The capsule of claim 1 wherein said heat transfer fluid is a synthetic fluorocarbon having the chemical formula $C_6F_5H$.

5. The combination with an internal combustion engine of an intake manifold having a mixture passage with an intake opening through the top of said manifold connecting with said passage and a heat opening through the bottom of said manifold, connecting with said passage beneath said intake opening, a carburetor mounted on said manifold so as to supply a mixture of air and fuel to said intake opening through said mixture passage, an exhaust manifold defining an exhaust gas passage extending beneath said intake manifold, said exhaust manifold having a heat opening extending upwardly from said exhaust passage through the top of said exhaust manifold and aligned with the heat opening of said intake manifold, said intake and exhaust manifolds having opposing flanges surrounding their respective heat openings, heat insulation means between said opposing flanges, a vapor heat transfer capsule having upper and lower cup-shaped members flanged at their open ends and having their flanged ends sealingly engaged to form a body having an enclosed sealed cavity and a peripheral flange, said flange being clamped between said manifold flanges with said capsule body within said manifold heat openings and separating the intake manifold mixture passage from the exhaust manifold gas passage, said upper cup-shaped member comprising a stainless steel stamping having a thickness of about 0.7 mm and including a flat upper condensing wall defining a fuel vaporizing hot plate, said lower cup-shaped member being formed of stamped stainless steel having a thickness of about 1.0 mm and having a flat lower evaporating wall forming a boiler surface, fins secured to the lower portion of said boiler wall and exposed to gases within said exhaust passage to increase the capability of heat transfer from the exhaust gases to said boiler wall, and a vaporizable heat transfer fluid sealed within said chamber and having a predetermined volume in the liquid state of less than one-tenth the volume of said chamber, said fluid being thermally stable at temperatures below about 400° C and having physical properties such that the boiling temperature, when the complete charge of fluid within the capsule has been vaporized, remains below the coking temperature of fuel in the air-fuel mixture passing through the intake manifold passage.

* * * * *